United States Patent
Wang et al.

(10) Patent No.: US 7,854,522 B2
(45) Date of Patent: Dec. 21, 2010

(54) ANTIGLARE FILM AND MANUFACTURING METHOD THEREOF

(75) Inventors: Li-Ching Wang, Jhongli (TW); Shih-Ming Chen, Hsinchu (TW); Jia-Chi Huang, Jhubei (TW); Chih-Kuang Chen, Taipei (TW)

(73) Assignee: Industrial Technology Research Institute (TW)

( * ) Notice: Subject to any disclaimer, the term of this patent is extended or adjusted under 35 U.S.C. 154(b) by 141 days.

(21) Appl. No.: 12/402,150

(22) Filed: Mar. 11, 2009

(65) Prior Publication Data

US 2009/0279176 A1    Nov. 12, 2009

(30) Foreign Application Priority Data

May 7, 2008    (TW) .............................. 97116772 A
Dec. 2, 2008    (TW) .............................. 97146735 A

(51) Int. Cl.
*G02B 1/11*    (2006.01)
*B05D 5/06*    (2006.01)

(52) U.S. Cl. .................................. 359/601; 427/164
(58) Field of Classification Search ................ 359/599, 359/601–614
See application file for complete search history.

(56) References Cited

U.S. PATENT DOCUMENTS

| 6,164,785 | A  | * | 12/2000 | Maekawa | 359/613 |
|---|---|---|---|---|---|
| 6,217,176 | B1 | * | 4/2001 | Maekawa | 359/601 |
| 6,921,578 | B2 | * | 7/2005 | Tsujino et al. | 428/428 |
| 7,354,163 | B2 | * | 4/2008 | Suzuki et al. | 359/601 |
| 2003/0134086 | A1 | * | 7/2003 | Nun et al. | 428/143 |
| 2004/0053043 | A1 |   | 3/2004 | Iwata et al. | |
| 2005/0255291 | A1 |   | 11/2005 | Iwata et al. | |
| 2006/0159902 | A1 |   | 7/2006 | Suzuki | |
| 2008/0014341 | A1 | * | 1/2008 | Richter et al. | 427/165 |
| 2008/0213513 | A1 | * | 9/2008 | Kameshima et al. | 428/1.32 |
| 2008/0218865 | A1 | * | 9/2008 | Iwata et al. | 359/601 |
| 2009/0002832 | A1 | * | 1/2009 | Tochigi et al. | 359/599 |

FOREIGN PATENT DOCUMENTS

| JP | 10-020103 | 1/1998 |
|---|---|---|
| JP | 2002-182015 | 6/2002 |
| JP | 2004-046258 | 12/2004 |

* cited by examiner

*Primary Examiner*—Mark Consilvio
(74) *Attorney, Agent, or Firm*—Lowe Hauptman Ham & Berner, LLP

(57) ABSTRACT

The invention provides an antiglare film. A resin layer is disposed on a substrate. Micro-aggregates are distributed in an interior and over a surface of the resin layer. Each of the micro aggregates has a size of 0.1-3 μm and is formed by aggregating aggregated nano-particles. The micro-aggregates distributing over the surface result in a surface roughness of the resin layer. The weight ratio of the resin layer to the micro-aggregates is 1:0.1-0.7.

21 Claims, 5 Drawing Sheets

ANTIGLARE FILM AND MANUFACTURING METHOD THEREOF

CROSS REFERENCE TO RELATED APPLICATIONS

This Application claims priority of Taiwan Patent Application No. 097116772, filed on May 7, 2008, and a Continuation-In-Part Taiwan Patent Application No. 097146735, filed on Dec. 2, 2008, the entirety of which is incorporated by reference herein.

BACKGROUND OF THE INVENTION

1. Field of the Invention

The present invention relates to an antiglare film and a manufacturing method thereof.

2. Description of the Related Art

Optical films of liquid crystal displays have been improved, with high contrast, wide viewing angles, high luminance, thinness, large sizes, higher precision, and other market demand functions. For display devices, display quality can be improved and scratch-resistant can be achieved with surface treatments for functional optical films. Optical films can be used for anti-glare, hard coating, anti-static, or anti-reflection purposes, based on their characteristics for improving dots per inch, contrast, and brightness. Since display devices are used in environments with external light, viewing quality is hindered by glare due to reflection of light. Thus, the optical film surface is treated for anti-glare and anti-reflection for decreasing reflection issues caused from external light, especially in bright environments, and improving viewing quality.

An effective method for controlling external light reflection may comprise treating optical films with an anti-glare treatment to diffuse the external light reflection or with an anti-reflection treatment to decrease light reflection intensity. Without surface treatment, 4-5% of external lights is reflected in the display device when the display device is being used. Normally, when users look at computer monitors, light reflection and glare on computer monitors makes viewing extremely uncomfortable for users. Thus, anti-glare characteristics of antiglare film are used and formed from an inner light diffusion structure or external light diffusion structure, or combinations thereof. The inner diffusion structure can be obtained by using various materials with different refraction indexes in the anti-glare film. The light scattering degree in the antiglare film can be controlled by adjusting the refraction index differences, content or size of the materials. The light scattering degree can also be controlled with an external diffusion structure by adjusting the shape or rough degree of the rough surface of the anti-glare film. Therefore, with the rough surface, the antiglare film allows the external diffusion structure to scatter light that would normally be directed toward user's eyes. Additionally, with different refraction index materials formed in the inside of the optical film, the optical film with the inner light diffusion structure, also scatters the light that would normally be directed toward user's eyes.

In conventional approaches, micro-particles of different sizes are added in a resin system for fabricating the anti-glare film. Although the particles are primarily dispersible in the resin system, phase separation occurs due to precipitation of the particles when the resin system is left standing. As a result, the dried coating suffers from a non-uniform quality and low process yield. For example, U.S. patent application Ser. No. 20040053043 describes an anti-glare film formed by adding micro-particles with diameters of 2-5 μm and 0.5-1.2 μm into a resin layer, and U.S. patent application Ser. No. 20060092495 describes an anti-glare film formed with a polymer compound solution containing micro-particles with diameters of 2-8 μm.

BRIEF SUMMARY OF INVENTION

A detailed description is given in the following embodiments with reference to the accompanying drawings.

The invention provides an antiglare film. A resin layer is disposed on a substrate. Micro-aggregates are distributed in an interior and over a surface of the resin layer. Each of the micro aggregates has a size of 0.1-3 μm and is formed by aggregating aggregated nano-particles. The micro-aggregates distributing over the surface result in a surface roughness of the resin layer. The weight ratio of the resin layer to the micro-aggregates is 1:0.1-0.7.

The invention also provides a method for manufacturing an antiglare film, comprising: (a) providing a mixture solution, wherein the mixture solution comprises a resin and silicon-containing nano-particles having diameters of 5-80 nm; (b) forming a coating solution by stirring the mixture solution for aggregating the silicon-containing nano-particles to form micro-aggregates uniformly distributed in the mixture solution, wherein the coating solution has a solid content of 20-60%, the weight of the silicon-containing nano-particles is about 10-50% of the total weight of the solid content; (c) coating the coating solution on a substrate; (d) forming a resin layer having a rough surface by drying the coating solution on the substrate for phase separation of the micro-aggregates; and (e) curing the resin layer.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

An antiglare film according to the present invention comprises micro-aggregates distributed in an interior and over a surface of the resin layer, and un-aggregated nano-particles distributed in the interior of the resin layer. Each of the micro aggregates is formed by aggregating aggregated nano-particles. The un-aggregated nano-particle and the aggregated nano-particles comprise silicon-containing materials having diameters of 5-80 nm. The antiglare film has a rough surface due to the micro-aggregates distributed over the surface of the resin layer. The difference in refraction index between the micro-aggregates and the resin layer results in the internal light diffusion characteristic of the antiglare film. The rough surface of the antiglare film results in the external light diffusion characteristic of the antiglare film. As described above, the structural characteristics of the antiglare film result in the antiglare characteristic. The silicon-containing aggregated nano-particles and un-aggregated nano-particles of high hardness distributed in the resin layer results in the high hardness and scratch-resistant of the antiglare film. In fabricating the antiglare film, since the micro-aggregates are uniformly and stably distributed in a coating solution, precipitation or phase separation does not occur even after standing for a long period of time. Thus the non-uniform issue of the antiglare film can be avoided.

Figure 1:
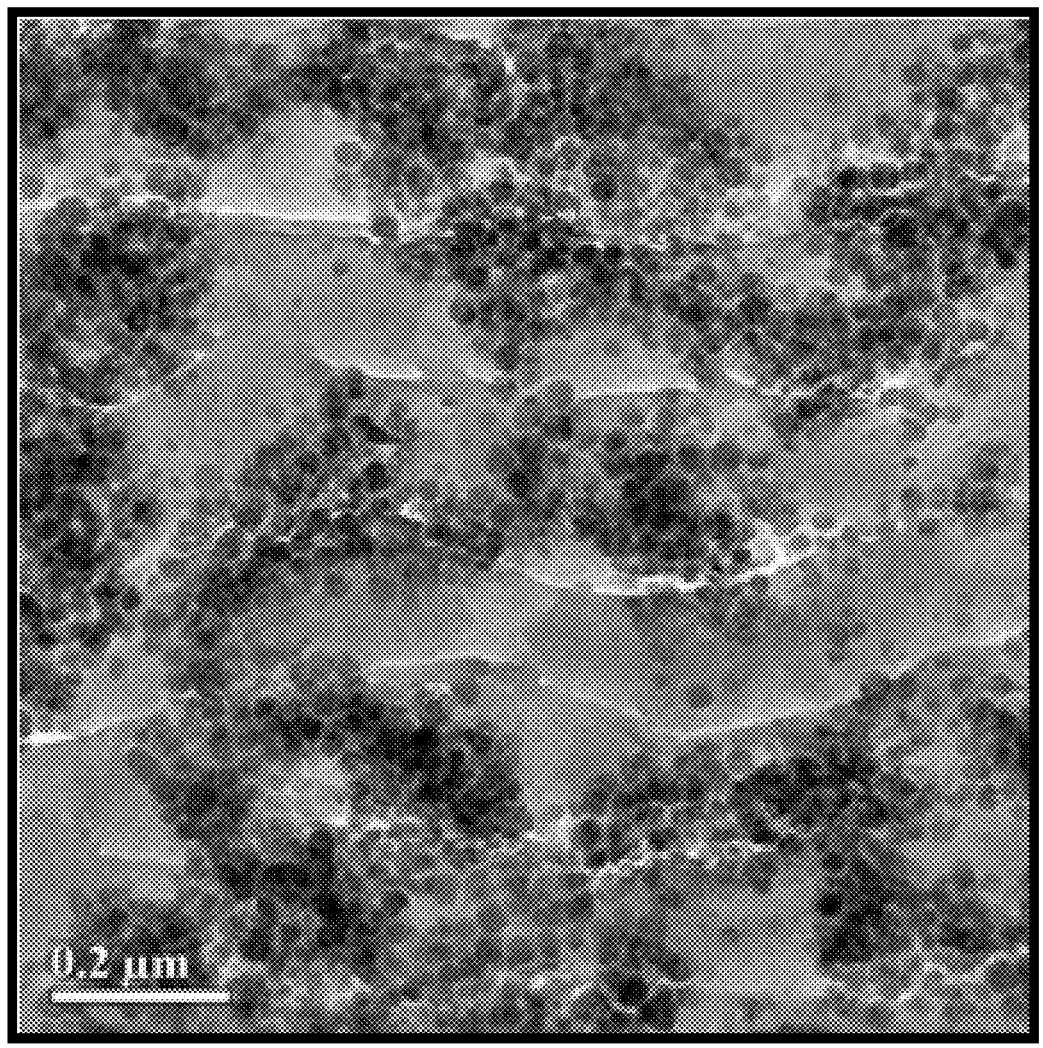
FIG. 1 is a TEM picture of a cross-section of an antiglare film of one example of the invention.
Figure 2:
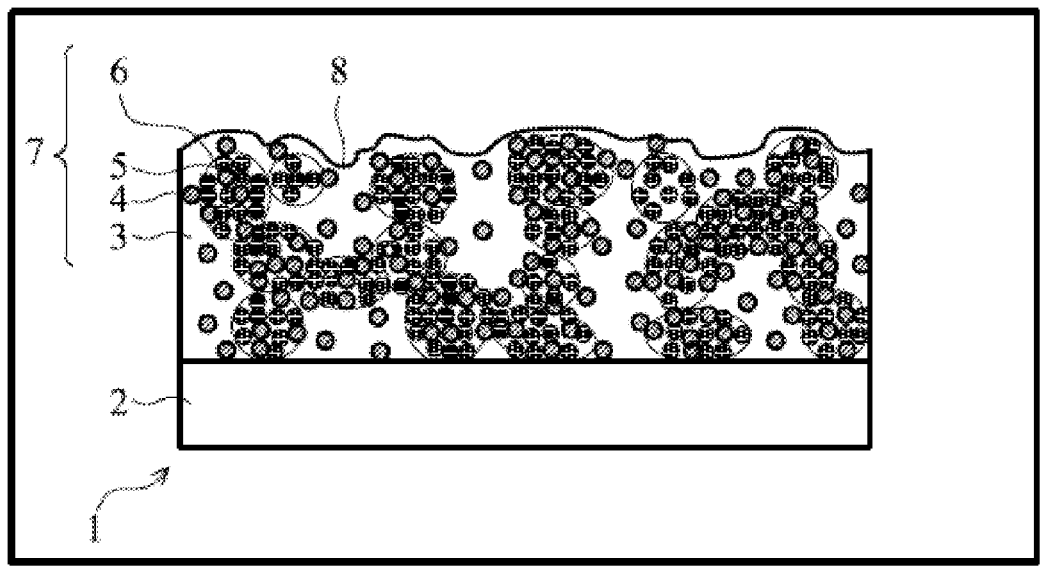
FIG. 2 is a schematic drawing showing a cross-section of the antiglare film according to an embodiment of the invention.

FIG. 1 is a TEM picture of a cross-section of an antiglare film of one example of the invention. FIG. 2 is a schematic drawing showing a cross-section of the antiglare film according to an embodiment of the invention. Referring to FIG. 2, an antiglare film 1 comprises a substrate 2 and an antiglare film 7 disposed on the substrate 2. The antiglare film 7 comprises a resin layer 3, micro-aggregates 6, and un-aggregated nano-particles 4. The micro-aggregates 6 are uniformly distributed in an interior and over a surface of the resin layer 3. Each of the micro aggregates 6 is formed by aggregating aggregated nano-particles 5. The antiglare film 7 has a rough surface 8 due to the micro-aggregates 6 distributed over the surface of the resin layer 3. The un-aggregated nano-particles 4 are distributed in the interior of the resin layer 3. The antiglare film 7 has two kinds of micro structure phase: discontinuous phase and continuous phase. The discontinuous phase is mainly composited of micro-aggregates 6 formed by aggregating nano-particles. The continuous phase is mainly composited of the resin layer 3 and un-aggregated nano-particles 4. The weight ratio of the resin layer 3 to the micro-aggregates 6 is 1:0.1-0.7, preferably 1:0.4-0.6. The aggregated nano-particles 5 and un-aggregated nano-particles 4 may be silicon-containing materials having diameters of 5-80 nm.

The substrate 2 of the antiglare film 1 may be a plastic substrate or glass substrate. The plastic substrate may comprise triacetyl cellulose (TAC), polyethylene terephthalate (PET), polycarbonate (PC), polymethyl methacrylate (PMMA), polyethylene naphthalate (PEN), or ARTON made by JSR Corporation of Japan or ZEONOR made by Zeon Corporation of Japan that comprises cyclo-olefin copolymer (COC). The resin layer 3 may comprise a light curing resin. In the preferred embodiment, the resin layer 3 is a UV curing resin. The aggregated nano-particles 5 of the micro-aggregates 6 or un-aggregated nano-particles 4 may be a silicon-containing material comprising silicon dioxide or zeolite. The micro-aggregates 6 may comprise once-aggregated aggregates and/or twice-aggregated aggregates of branch structure. Therefore, a diameter of the micro-aggregates 6 of the antiglare film 1 is about 0.1-3 μm. A thickness of the antiglare film 7 is between about 1 μm and 10 μm.

As the aggregated nano-particles 5 comprise silicon dioxide or zeolite, the difference in refractive index between the micro-aggregates 6 and the resin layer 3 results in the internal light diffusion characteristic of the antiglare film 1. As the micro-aggregates 6 distribute over the surface of the resin layer 3, the rough surface 8 of the antiglare layer 7 results in the external light diffusion characteristic of the antiglare film 1. As described above, the antiglare film 1 combines the internal light diffusion effect and the external light diffusion effect, and therefore superior antiglare effects can be achieved. The silicon-containing aggregated nano-particles 5 and un-aggregated nano-particles 4 of high hardness distributed in the resin layer 3 proved the antiglare film 1 with high hardness and anti-scratch features.

A method for fabricating the antiglare film comprises preparing a resin solution or a zeolite solution. The resin solution mainly comprises: a light initiator, polymer monomer (or oligomer, or pre-polymer), silicon-containing nano-particles, solvent, etc. It is noted that the above components may be a single kind or a combination of various kinds. For example, more than two kinds of the light initiators or more than two kinds of the polymer monomers can be used. In addition, the resin solution may also comprise other commonly used additives, such as leveling agent, surfactant agent, cross-linking agent, etc. In one specific embodiment, Chivacure 73(UV initiator) and Chicacure 184(UV initiator), Doublemer 87A (oligomer with six-acrylate function groups, such as aliphatic urethane hexa-acrylate oligomer), Doublemer 570(oligomer with two-acrylate function groups, such as aliphatic urethane oligomer), trimethylol propane triacrylate (TMPTA) monomer with three functional groups, a leveling agent 9011(all chemicals are manufactured by DBC corporation), and MEK-ST sol (methyl-ethyl ketone (MEK) sol of 30 wt % of silica particles (with diameters of about 5-80 nm) manufactured by Nissan corporation) are mixed and then thoroughly stirred with a magnet stirrer to form the resin solution. The refraction index of the resin solution is about 1.5-1.51.

A solution capable of forming nano-zeolite particles is first prepared for forming the zeolite solution. The solution capable of forming nano-zeolite particles comprises a silica source, water, and a structure-directing agent (SDA). The silica source can comprise C1-2 alkyl orthosilicate. The zeolite structure directing agent (SDA) can be quaternary ammonium hydroxide. In the preferred embodiment, the silica source is tetra ethyl orthosilicate, and the zeolite structure directing agent is tetrapropylammonium hydroxide.

After the solution capable of forming nano-zeolite particles is prepared, the solution is concentrated by heating under a temperature of 60-100° C. for 3-5 hrs for increasing the content of silicon dioxide up to 20-40 wt %. Then, the solution is stabilized by heating under a temperature of 60-100° C. for 20-48 hrs to form the zeolite solution. The zeolite solution is a transparent solution with 25-40 wt % zeolite. The refraction index of the zeolite solution is about 1.4. With the stabilizing step, the nano-particles (with diameters of about 5-80 nm) are grown stably and distributed uniformly in the zeolite solution, thus precipitation or phase separation does not occur. However, without the stabilizing step, the nano-particles are grown unstably. The nano-particles may be over-grown to micro-scale easily. Thus, precipitating would occur and the turbidity would increase in the zeolite solution.

A mixture solution can be prepared by either mixing the resin solution with a solvent, or mixing the resin solution, zeolite solution, and the solvent. In the above description, the zeolite solution may be replaced by other silicon-containing nano-particles solution or sol gel such as silicon dioxide sol gel. The solvent may be an isopropyl alcohol (IPA), isobutanol (IBA), or other suitable solvents. The solvent may be the same with that of the resin solution, the zeolite solution, or other reactant solution. One or more kinds of the solvent can be used for preparing the mixture solution. When the said solutions are mixed, the phase separation of non-compatibility between the silicon-containing solution and the resin solution occurs due to the significant polarity difference of which.

A coating solution is formed by stirring the mixture solution rapidly for aggregating the silicon-containing nano-particles to form micro-aggregates uniformly distributed in the mixture solution. The coating solution has a solid content of, for example, about 20-60%, preferably about 25-55%, wherein the weight of the silicon-containing nano-particles is about 10-50%, preferably about 30-40% of the total weight of the solid content. In one embodiment, the rate of the rapidly stirring step is about 3500-5000 rpm, the stirring time is about 5-40 minutes, preferably about 10-30 minutes. In stirring the mixture solution for forming the coating solution, the aggregation degree of aggregating silicon-containing nano-particles to form the micro-aggregates and the distribution situation of the micro-aggregates in the coating solution can be controlled by the type or compositional ratios of the solvent due to the different compatibilities of different solvents with the silicon-containing nano-particles and resin. In examples of the invention, since the micro-aggregates aggregated from the silicon-containing nano-particles are uniformly and stably distributed in the coating solution, precipitation or phase separation never occurs even after standing for a long period of time.

The coating solution is then coated on a substrate. Examples of suitable coating methods comprise rod coating, blade coating, extrusion coating, gravure coating, or roll coating methods. Then, the antiglare layer having a rough surface is formed by drying the coating solution on the substrate for phase separation of the micro-aggregates. In the drying step, the re-aggregation or separation between the micro-aggregates can be controlled by the type or compositional ratios of the solvent due to the different volatilities. Micro-aggregates are uniformly distributed in the interior and over the surface of the antiglare layer. The antiglare layer has a rough surface due to the micro-aggregates distributed over the surface of the antiglare layer. Then, the antiglare layer is cured.

According to the present invention, the haze value of the antiglare layer is about 15-50 (the haze value of commercial antiglare layers is about 10-50), and the total transmittance of the antiglare layer (measured using Nippon Denshoku 300A) is about 89%-93% (the total transmittance of commercial antiglare layers is about 89%-92%). The clarity of the antiglare layer (measured by using a TM image clarity test instrument ICM-1T produced by SUGA corporation) is about 20-55 (the clarity of commercial antiglare layers is about 20-70). The gloss value of the antiglare layer (measured by using BYK-Gardner micro-TRI-gloss measures) is about 27-50 (the clarity of commercial antiglare layers is about 18-55). Therefore, the antiglare layers of embodiments of the present invention meet the specification requirements for commercial antiglare films.

The refraction indexes of the micro-aggregates and the resin layer of the antiglare are different. The difference in refraction of the micro-aggregates and the resin layer is about 0.01-0.15.

The following examples are intended to demonstrate this invention more fully without limiting its scope, since numerous modifications and variations will be apparent to those skilled in the art.

PREPARATION EXAMPLE 1

Resin Solution 2.34 g of Chivacure 173 and 1.56 g of Chicacure 184 of UV initiator, 7.5 g of Doublemer 87A (oligomer with six-acrylate function groups, such as aliphatic urethane hexa-acrylate oligomer), 5 g of Doublemer 570 (oligomer with two-acrylate function groups: aliphatic urethane oligomer), 18.7 g of trimethylol propane triacrylate (TMPTA) monomer with three functional groups, 0.63 g of a leveling agent 9011 (all chemicals are manufactured by DBC corporation), and 62 g of MEK-ST sol (methyl-ethyl ketone (MEK) sol of 30 wt % of silica particles (with diameters of about 5-80 nm) manufactured by Nissan corporation) are mixed and then thoroughly stirred with a magnet stirrer to form the resin solution of an uniform phase.

PREPARATION EXAMPLE 2

Zeolite Solution 11.58 g of tetraethoxysilane (manufactured by Fluka corporation) and 79.8 ml of deionized water were added into 7.08 g of tetra-n-propulammonium hydroides of a concentration of 40% (manufactured by Alfa Aesar corporation). The solution was stirred for 45 minutes at a room temperature to obtain a clear solution. Then, the solution was concentrated by a vacuum treatment at a temperature of 80° C. to a specific concentration. Then the solution was heated at a temperature of 80° C. for 30 hours, thus forming the zeolite solution. The zeolite solution contained 3.34 g of zeolite and 4.4 g of water.

EXAMPLE 1

Figure 3:
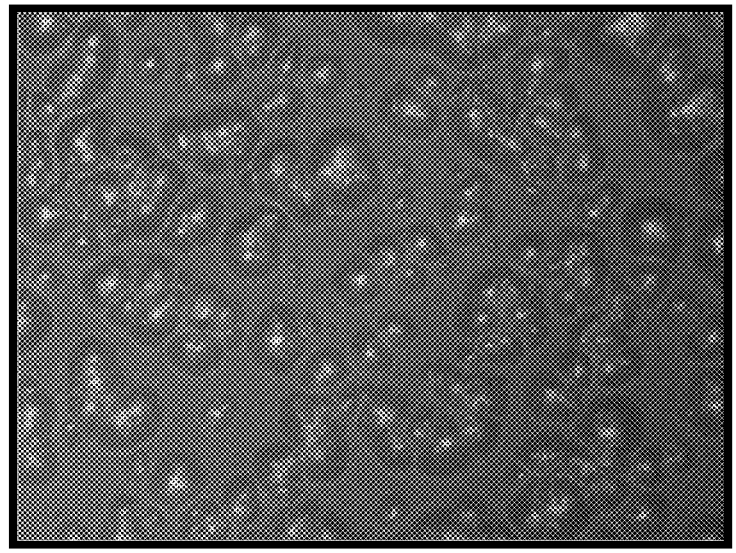
FIGS. 3-7 are OM pictures of the antiglare films, of Examples 1-5 of the invention.

0.10 g of the zeolite solution of Preparation example 2 (containing 0.034 g of nano-zeolite particle (diameter of about 50 nm) and 0.042 g of water) and 6 g of the resin solution of Preparation example 1 (containing 1.35 g of nano-silicon dioxide particles uniformly dispersing in the resin solution, and 2.55 g of UV curing resin and 2.1 g of MEK) were mixed. When the said solutions were mixed, the phase separation of non-compatibility between the zeolite solution and the UV curing resin solution occurred due to the significant polarity difference of which. By rapidly stirring the solutions at a rate of 4000 rpm for 20 minutes, the micro-aggregates were formed. After adding 1.85 g of IPA into the solution, the solution was stirred for 5 minutes to obtain a coating solution with a solid content of about 49.5 wt %, wherein the weight of the nano-particles was 35.2% of the total weight of the solid content. The coating solution was coated on a clean triacetyl cellulose (TAC) film as a substrate by rod coating. The coating solution coated on the substrate was a transparent film having a thickness of about 3 μm. The coating solution was dried by evaporating the solvent in the coating solution under room temperature to form a hazy antiglare film. Then, the antiglare film was cured by using UV irradiation with a rate of 8 m/min (energy of about 0.9 J/cm$^2$). FIG. 3 is an OM picture of the antiglare film. The test results of the antiglare film are shown in Table 1 to Table 3.

EXAMPLE 2

Figure 4:
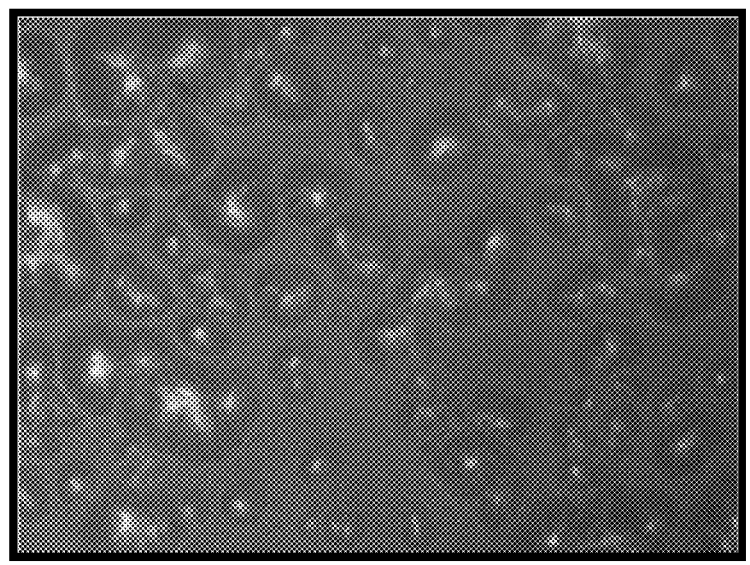

0.18 g of the zeolite solution of Preparation example 2 (containing 0.061 g of nano-zeolite particle (diameter of about 50 nm) and 0.077 g of water), 6 g of the resin solution of Preparation example 1 (containing 1.35 g of nano-silicon dioxide particles uniformly dispersing in the resin solution, and 2.55 g of UV curing resin and 2.1 g of MEK), and 6.3 g of IPA were mixed. When the said solutions were mixed, the phase separation of non-compatibility between the zeolite solution and the UV curing resin solution occurred due to the significant polarity difference of which. By rapidly stirring the solutions at a rate of 4000 rpm for 15 minutes, a coating solution containing micro-aggregates was formed. The coating solution had a solid content of about 31.7 wt %, wherein the weight of the nano-particles was 35.62% of the total weight of the solid content. The coating solution was coated on a clean triacetyl cellulose (TAC) film as a substrate by rod coating. The coating solution coated on the substrate was a transparent film having a thickness of about 3 μm. The coating solution was dried by evaporating the solvent in the coating solution under room temperature to form a hazy antiglare film. Then, the antiglare film was cured by using UV irradiation with a rate of 8 m/min (energy of about 0.9 J/cm$^2$). FIG. 4 is an OM picture of the antiglare film. The test results of the antiglare film are shown in Table 1 to Table 3.

EXAMPLE 3

Figure 5:
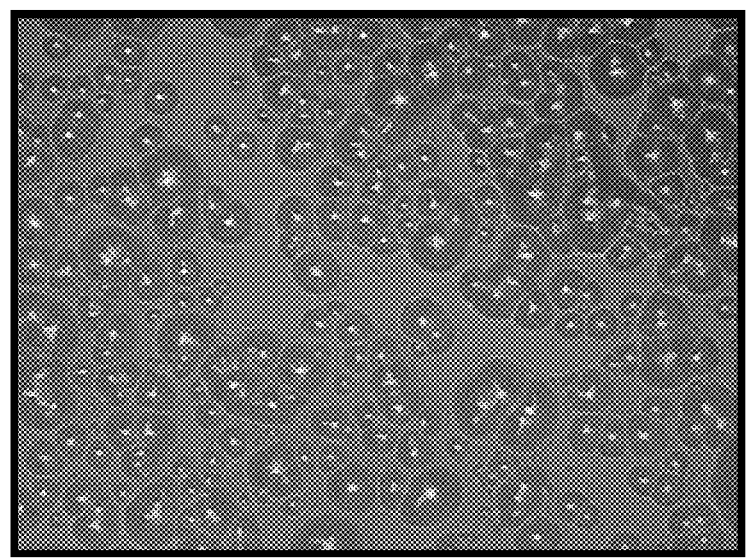

0.22 g of the zeolite solution of Preparation example 2 (containing 0.075 g of nano-zeolite particle (diameter of about 50 nm) and 0.094 g of water), 6 g of the resin solution of Preparation example 1 (containing 1.35 g of nano-silicon dioxide particles uniformly dispersing in the resin solution, and 2.55 g of UV curing resin and 2.1 g of MEK), and 2.1 g of IBA were mixed. When the said solutions were mixed, the phase separation of non-compatibility between the zeolite solution and the UV curing resin solution occurred due to the significant polarity difference of which. By rapidly stirring the solutions at a rate of 3800 rpm for 22 minutes, a coating solution containing micro-aggregates was formed. The coating solution had a solid content of about 47.8 wt %, wherein the weight of the nano-particles was 35.5% of the total weight of the solid content. The coating solution was coated on a clean triacetyl cellulose (TAC) film as a substrate by rod coating. The coating solution coated on the substrate was a transparent film having a thickness of about 3 μm. The coating solution was dried by evaporating the solvent in the coating solution under room temperature to form a hazy antiglare film. Then, the antiglare film was cured by using UV irradiation with a rate of 8 m/min (energy of about 0.9 J/cm$^2$). FIG. 5 is an OM picture of the antiglare film. The test results of the antiglare film are shown in Table 1 to Table 3.

EXAMPLE 4

Figure 6:
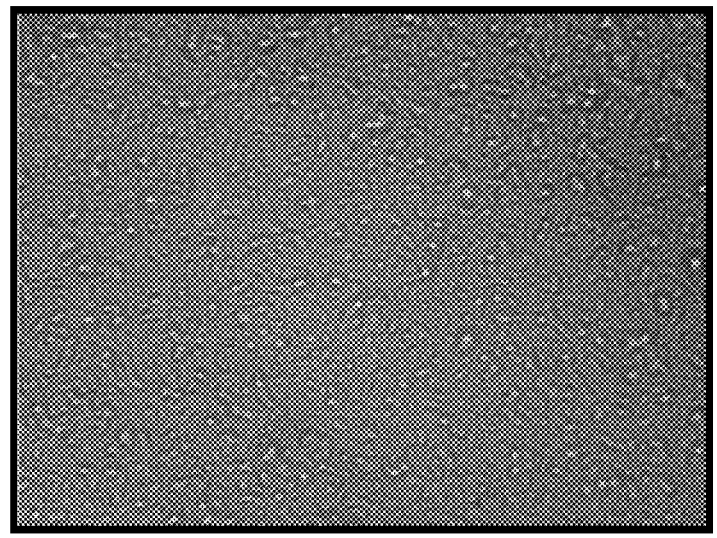

0.25 g of the zeolite solution of Preparation example 2 (containing 0.085 g of nano-zeolite particle (diameter of about 50 nm) and 0.107 g of water), 6 g of the resin solution of Preparation example 1 (containing 1.35 g of nano-silicon dioxide particles uniformly dispersing in the resin solution, and 2.55 g of UV curing resin and 2.1 g of MEK), and 6.3 g of IBA were mixed. When the said solutions were mixed, the phase separation of non-compatibility between the zeolite solution and the UV curing resin solution occurred due to the significant polarity difference of which. By rapidly stirring the solutions at a rate of 3800 rpm for 15 minutes, a coating solution containing micro-aggregates was formed. The coating solution had a solid content of about 31.8 wt %, wherein the weight of the nano-particles was 36% of the total weight of the solid content. The coating solution was coated on a clean triacetyl cellulose (TAC) film as a substrate by rod coating. The coating solution coated on the substrate was a transparent film having a thickness of about 3 μm. The coating solution was dried by evaporating the solvent in the coating solution under room temperature to form a hazy antiglare film. Then, the antiglare film was cured by using UV irradiation with a rate of 8 m/min (energy of about 0.9 J/cm$^2$). FIG. 6 is an OM picture of the antiglare film. The test results of the antiglare film are shown in Table 1 to Table 3.

EXAMPLE 5

Figure 7:
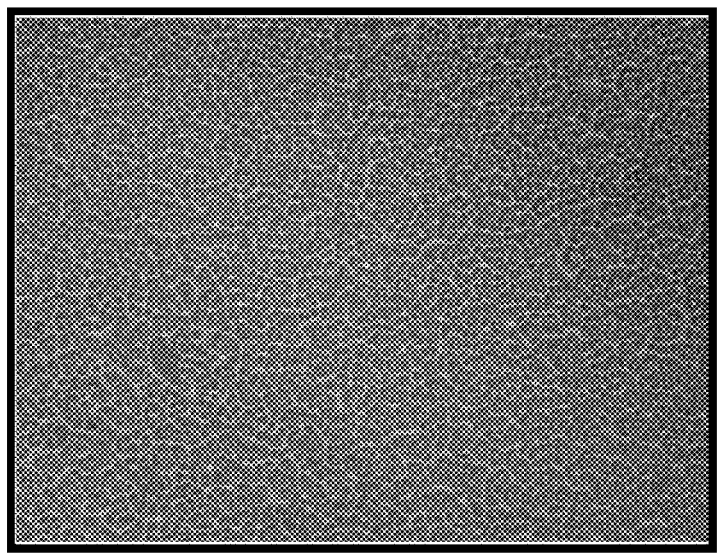

A solution, containing 5.77 g of IPA, 0.76 g of IBA, and 0.76 g of IPA-ST (manufactured by Nissan corporation), a IPA sol containing nano silica particles (of diameters of about 5-80 nm) present in an amount of 30 wt %, was prepared. Another solution, containing 6 g of the resin solution of Preparation example 1 (containing 1.35 g of nano-silicon dioxide particles uniformly dispersing in the resin solution, and 2.55 g of UV curing resin and 2.1 g of MEK) and 0.70 g of MIBK, was also prepared. When the two solutions were mixed, the mutually collided nano-particles in the IPA sol and nano-silicon dioxide particles in the resin solution were easily aggregated together due to the similar polarities. By rapidly stirring the solutions at a rate of 4000 rpm for 12 minutes, a coating solution containing micro-aggregates was formed. The coating solution had a solid content of about 25.9 wt %, wherein the weight of the nano-particles was 38.2% of the total weight of the solid content. The coating solution was coated on a clean triacetyl cellulose (TAC) film as a substrate by rod coating. The coating solution coated on the substrate was a transparent film having a thickness of about 3 μm. The coating solution was dried by evaporating the solvent in the coating solution under room temperature to form a hazy antiglare film. Then, the antiglare film was cured by using UV irradiation with a rate of 8 m/min (energy of about 0.9 J/cm$^2$). FIG. 7 is an OM picture of the antiglare film. The test results of the antiglare film are shown in Table 1 to Table 3.

COMPARATIVE EXAMPLE 1

After adding 0.1 g of XS-350H containing PS particles with diameters of about 3.5 μm, 0.15 g of XS-500 containing PS particles with diameters of about 5 μm, and 0.35 g of XS-1000 (all chemicals are manufactured by Soken corporation) containing PMMA particles with diameters of about 10 μm into 12.3 g of the resin solution (containing 2.75 g of nano-silicon dioxide particles (of diameters of about 5-80 nm) uniformly dispersing in the resin solution, and 5.25 g of UV curing resin and 4.1 g of MEK), the solution was stirred rapidly at a rate of 6000 rpm for 15 minutes to uniformly disperse the added particles to form a coating solution with a solid content of 66.7 wt %. The coating solution was coated on a clean triacetyl cellulose (TAC) film as a substrate by rod coating. The coating solution coated on the substrate was a transparent film having a thickness of about 6 μm. The coating solution was dried by evaporating the solvent in the coating solution under room temperature to form a hazy antiglare film. Then, the antiglare film was cured by using UV irradiation with a rate of 8 m/min (energy of about 0.9 J/cm$^2$).

COMPARATIVE EXAMPLE 2

After adding 0.3 g of XS-500 containing PS particles with diameters of about 5 μm and 0.3 g of XS-1000 (all chemicals are manufactured by Soken corporation) containing PMMA particles with diameters of about 10 μm into 11.5 g of the resin solution (containing 2.58 g of nano-silicon dioxide particles (of diameters of about 5-80 nm) uniformly dispersing in the resin solution, and 4.90 g of UV curing resin and 4.03 g of MEK), the solution was stirred rapidly at a rate of 6000 rpm for 15 minutes to uniformly disperse the added particles to form a coating solution with a solid content of 66.8 wt %. The coating solution was coated on a clean triacetyl cellulose (TAC) film as a substrate by rod coating. The coating solution coated on the substrate was a transparent film having a thickness of about 6 μm. The coating solution was dried by evaporating the solvent in the coating solution under room temperature to form a hazy antiglare film. Then, the antiglare film was cured by using UV irradiation with a rate of 8 m/min (energy of about 0.9 J/cm$^2$).

Figure 8:
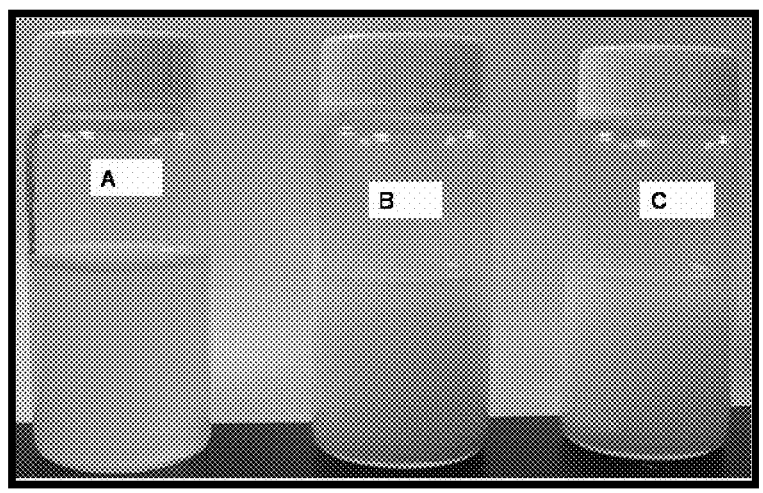
FIG. 8 shows a picture of the coating solutions, after stirring, of Example 4A, Example 1B, and Comparative Example 2C of the invention.
Figure 9:
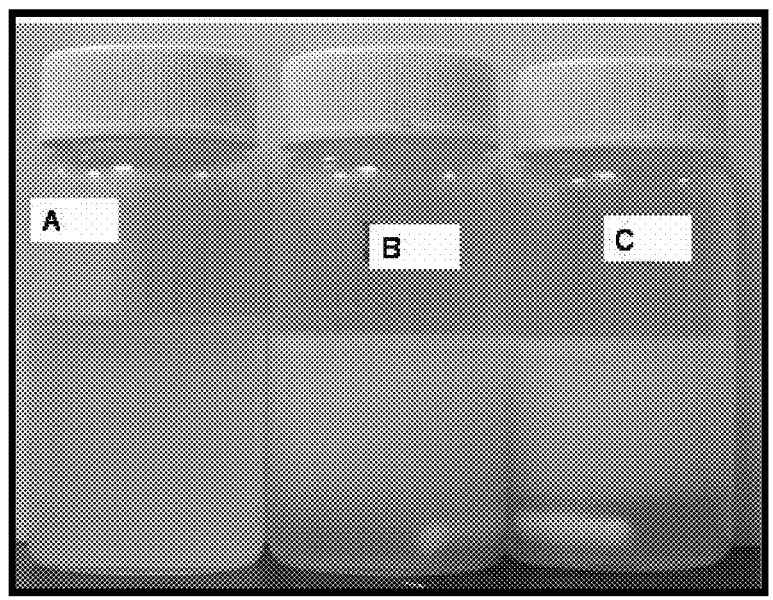
FIG. 9 shows a picture of the coating solutions, after left standing for 18 hrs, of Example 4A, Example 1B, and Comparative Example 2C of the invention.

FIG. 8 shows a picture of the coating solutions, after stirring, of Example 4A, Example 1B, and Comparative Example 2C of the invention. FIG. 9 shows a picture of the coating solutions, after left standing for 18 hrs, of Example 4A, Example 1B, and Comparative Example 2C of the invention. When comparing FIG. 8 and FIG. 9, it is shown that the micro-aggregates were stably and uniformly distributed in the coating solution fabricated by the method according to the present invention. However, phase separation occurred in the coating solution fabricated by the method of comparative examples, due to precipitation of the micro-particles in the coating solution after the coating solution had been left standing for a long period of time. Therefore, a method, more stable than prior art, for fabricating an antiglare film is provided.

According to the invention, the structural characteristics of the antiglare film results in the internal light diffusion effect and the external effect. The antiglare film has excellent antiglare, high hardness, and scratch-resistant characteristics.

According to the invention, in fabricating the antiglare film, since the micro-aggregates are uniformly and stably distributed in the coating solution, precipitation or phase separation does not occur even after standing for a long period of time. Thus the non-uniform issue of the antiglare film can be avoided.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

TABLE 1

Haze test result of antiglare

|  | haze value | total transmittance (%) |
| --- | --- | --- |
| Example 1 | 22.82 | 90.12 |
| Example 2 | 23.93 | 89.64 |
| Example 3 | 34.25 | 91.28 |
| Example 4 | 27.32 | 89.44 |
| Example 5 | 32.93 | 90.00 |

TABLE 2

Image clarity test result of antiglare

|  | clarity |
| --- | --- |
| Example 1 | 42.4 |
| Example 2 | 36.6 |
| Example 3 | 54.5 |
| Example 4 | 22.2 |
| Example 5 | 31.3 |

TABLE 3

Gloss test result with 60° test angle of antiglare

|  | gloss value (GU) |
| --- | --- |
| Example 1 | 47.0 |
| Example 2 | 27.7 |
| Example 3 | 30.8 |
| Example 4 | 42.3 |
| Example 5 | 27.3 |

What is claimed is:

1. An antiglare film, comprising:
    a substrate;
    a resin layer disposed on the substrate;
    micro-aggregates uniformly distributed in an interior and over a surface of the resin layer, wherein each of the micro aggregates has a size of 0.1-3 μm and is formed by aggregating silicon-containing nano-particles, and the micro-aggregates distributing over the surface results in a surface roughness of the resin layer;
    wherein the weight ratio of the resin layer to the micro-aggregates is 1:0.1-0.7.

2. The antiglare film as claimed in claim 1, wherein the silicon-containing nano-particles have diameters of 5-80 nm.

3. The antiglare film as claimed in claim 1, further comprising un-aggregated silicon-containing nano-particles distributed in the interior of the resin layer.

4. The antiglare film as claimed in claim 1, wherein the substrate comprises plastic substrate or glass substrate.

5. The antiglare film as claimed in claim 1, wherein the silicon-containing material comprises silicon dioxide, zeolite, or combination thereof.

6. The antiglare film as claimed in claim 1, wherein the plastic substrate comprises triacetyl cellulose (TAC), polyethylene terephthalate (PET), polycarbonate (PC), polymethyl methacrylate (PMMA), polyethylene naphthalate (PEN), or cyclo-olefin copolymer (COC).

7. The antiglare film as claimed in claim 1, wherein the micro-aggregates are a discontinuous phase and the resin layer is a continuous phase.

8. The antiglare film as claimed in claim 1, wherein refraction indexes of the micro-aggregates and the resin layer are different, and index differences of the micro-aggregates and the resin layer is 0.01-0.15.

9. The antiglare film as claimed in claim 1, wherein the resin layer is a light curing resin.

10. The antiglare film as claimed in claim 9, wherein the light curing resin comprises UV curing resin.

11. The antiglare film as claimed in claim 1, wherein the resin layer has a thickness of 1-10 μm.

12. A method for manufacturing an antiglare film, comprising:
    (a) providing a mixture solution, wherein the mixture solution comprises a resin and silicon-containing nano-particles having diameters of 5-80 nm;
    (b) forming a coating solution by stirring the mixture solution for aggregating the silicon-containing nano-particles to form micro-aggregates uniformly distributed in the mixture solution, wherein the coating solution has a solid content of 20-60%, the weight of the silicon-containing nano-particles is about 10-50% of the total weight of the solid content;

(c) coating the coating solution on a substrate;

(d) forming a resin layer having a rough surface by drying the coating solution on the substrate for phase separation of the micro-aggregates; and (e) curing the resin layer.

13. The method for manufacturing the antiglare film as claimed in claim 12, wherein the coating method comprises rod coating, blade coating, extrusion coating, gravure coating, or roll coating.

14. The method for manufacturing the antiglare film as claimed in claim 12, wherein the silicon-containing nano-particles comprise silicon dioxide, zeolite, or combination thereof.

15. The method for manufacturing the antiglare film as claimed in claim 12, wherein the micro-aggregates have diameters of 0.1-3 μm.

16. The method for manufacturing the antiglare film as claimed in claim 12, wherein the resin layer is a light curing resin.

17. The method for manufacturing the antiglare film as claimed in claim 16, wherein the light curing resin comprises UV curing resin.

18. The method for manufacturing the antiglare film as claimed in claim 17, wherein the UV curing resin is cured by UV light irradiation.

19. The method for manufacturing the antiglare film as claimed in claim 12, wherein the mixture solution is stirred at a rate of 3500-5000 rpm in the step (b).

20. The method for manufacturing the antiglare film as claimed in claim 19, wherein the stirring time in the step (b) is 5-40 minutes.

21. The method for manufacturing the antiglare film as claimed in claim 12, wherein the weight of the silicon-containing nano-particles is preferably about 30-40% of the total weight of the solid content.

\* \* \* \* \*